(12) United States Patent
Matsuoka

(10) Patent No.: US 9,840,837 B1
(45) Date of Patent: Dec. 12, 2017

(54) VARIABLE SHAPE THREE-DIMENSIONAL STRUCTURE USING EXTENDABLE ARM

(71) Applicant: FUJIMIYASEISAKUSHO CO., LTD., Kumamoto (JP)

(72) Inventor: Norimichi Matsuoka, Kumamoto (JP)

(73) Assignee: FUJIMIYASEISAKUSHO CO., LTD., Kumamoto (JP)

( * ) Notice: Subject to any disclaimer, the term of this patent is extended or adjusted under 35 U.S.C. 154(b) by 0 days.

(21) Appl. No.: 15/428,453

(22) Filed: Feb. 9, 2017

(30) Foreign Application Priority Data

Aug. 8, 2016 (JP) ................................. 2016-155719

(51) Int. Cl.
| | |
|---|---|
| *E04B 1/343* | (2006.01) |
| *E04B 1/344* | (2006.01) |
| *E04B 1/19* | (2006.01) |
| *B66F 11/04* | (2006.01) |
| *B66F 3/22* | (2006.01) |

(52) U.S. Cl.
CPC ............ *E04B 1/34357* (2013.01); *E04B 1/19* (2013.01); *E04B 1/344* (2013.01); *B66F 3/22* (2013.01); *B66F 11/042* (2013.01)

(58) Field of Classification Search
CPC ........ E04B 1/34357; E04B 1/344; E04B 1/19; E04B 1/34315; B66F 3/22; B66F 11/042
USPC .......................................................... 52/109
See application file for complete search history.

(56) References Cited

U.S. PATENT DOCUMENTS

| | | | | |
|---|---|---|---|---|
| 136,883 | A * | 3/1873 | Von Ehren ............ | B66F 11/042 182/141 |
| 2,697,845 | A * | 12/1954 | Broner .................. | E01D 15/124 14/45 |
| 3,888,056 | A * | 6/1975 | Kelly ...................... | E04L 31/32 135/145 |
| RE31,565 | E * | 4/1984 | Beaulieu ............... | E04B 1/3441 135/145 |
| 4,575,975 | A * | 3/1986 | Eisenberg ............. | B66F 7/0691 108/132 |
| 4,658,560 | A * | 4/1987 | Beaulieu ................. | E04L 31/19 211/182 |
| 4,779,635 | A * | 10/1988 | Lynch ..................... | E04H 15/50 135/145 |

(Continued)

FOREIGN PATENT DOCUMENTS

| | | |
|---|---|---|
| JP | S60-179598 | 11/1985 |
| JP | 2008-308940 | 12/2008 |
| JP | 2014159070 A | 9/2014 |

*Primary Examiner* — Adriana Figueroa
(74) *Attorney, Agent, or Firm* — Hauptman Ham, LLP

(57) ABSTRACT

A variable shape three-dimensional structure includes: an upper frame; a lower frame; and a longitudinal coupling member that couples the upper and lower frames. Each of the frames includes cross units and an end coupling portion. Each cross unit is formed by two rigid members crossing each other and pivotally coupled together. The end coupling portion pivotally couples the ends of the rigid members of the cross units. The longitudinal coupling member includes a bent unit comprising a first and second bent rigid members, and a bent portion coupling shaft. The first and second bent rigid members are bent in a V-shape. The bent portion coupling shaft pivotally couples the bent portions of the first and second bent rigid members. The upper end of the bent unit is coupled to the upper frame and the lower end of the bent unit is coupled to the lower frame.

6 Claims, 7 Drawing Sheets

(56) References Cited

U.S. PATENT DOCUMENTS

| | | | | |
|---|---|---|---|---|
| 5,038,532 A | * | 8/1991 | Shahinpoor | E04B 1/3441 52/109 |
| 5,351,843 A | * | 10/1994 | Wichman | E04H 12/185 211/182 |
| 9,153,860 B2 | * | 10/2015 | Tserodze | F24J 2/523 |
| 2004/0144413 A1 | | 7/2004 | Matthews et al. | |
| 2015/0300560 A1 | | 10/2015 | Matsuoka | |

* cited by examiner

VARIABLE SHAPE THREE-DIMENSIONAL STRUCTURE USING EXTENDABLE ARM

BACKGROUND OF THE INVENTION

Field of the Invention

The present invention relates to variable shape three-dimensional structures whose shape can be changed according to an extending/contracting operation of an extendable arm.

Background Art

The applicant of the present application proposed in Japanese Unexamined Patent Application Publication No. 2014-159070 an extendable arm that extends and contracts in a curved path. This extendable arm is formed by a plurality of cross units connected in a linear fashion, and each cross unit is formed by two rigid members crossing each other in an X-shape.

SUMMARY OF INVENTION

The inventors of the present application considered more effective use of such an extendable arm and found that a three-dimensional shape and the area of a two-dimensional shape can be changed by using the extendable arm.

It is an object of the present invention to provide a variable shape three-dimensional structure whose shape can be changed according to an extending/contracting operation of an extendable arm.

A variable shape three-dimensional structure according to the present invention includes an upper frame, a lower frame, and a longitudinal coupling member. The longitudinal coupling member couples the upper and lower frames such that the upper and lower frames are separated from and parallel to each other.

The upper frame includes a plurality of cross units each formed by two rigid members crossing each other in an X-shape and pivotally coupled by a middle coupling shaft, and an end coupling portion that pivotally couples ends of the rigid members of adjoining ones of the cross units. The end coupling portion of the upper frame includes inner end coupling shafts located on an inner side of the upper frame, and outer end coupling shafts located on an outer side of the upper frame.

The lower frame includes a plurality of cross units each formed by two rigid members crossing each other in an X-shape and pivotally coupled by a middle coupling shaft, and an end coupling portion that pivotally couples ends of the rigid members of adjoining ones of the cross units. The end coupling portion of the lower frame includes inner end coupling shafts located on an inner side of the lower frame, and outer end coupling shafts located on an outer side of the lower frame.

The longitudinal coupling member includes a bent unit. The bent unit includes a first bent rigid member, a second bent rigid member, and a bent portion coupling shaft. The first and second bent rigid members are bent in a V-shape so that the V-shapes of the first and second bent rigid members open in opposite directions. The bent portion coupling shaft pivotally couples a bent portion of the first bent rigid member and a bent portion of the second bent rigid member.

An upper end of the bent unit is coupled to the upper frame located at an upper position, and a lower end of the bent unit is coupled to the lower frame located at a lower position.

In one embodiment, the upper end of the bent unit is coupled to two of the inner end coupling shafts of the upper frame which oppose each other, and the lower end of the bent unit is coupled to two of the inner end coupling shafts of the lower frame which oppose each other.

In another embodiment, the bent unit includes a first bent unit and a second bent unit, an end of the first bent unit and an end of the second bent unit being pivotally coupled together. An upper end of the first bent unit is coupled to two of the inner end coupling shafts, two of the outer end coupling shafts, or two of the middle coupling shafts of the upper frame. A lower end of the second bent unit is coupled to two of the inner end coupling shafts, two of the outer end coupling shafts, or two of the middle coupling shafts of the lower frame.

In the one embodiment or the another embodiment, in each of the first and second bent rigid members of the first bent unit, a length from the bent portion coupling shaft to an upper end of the bent rigid member is shorter than a length from the bent portion coupling shaft to a lower end of the bent rigid member. In each of the first and second bent rigid members of the second bent unit, a length from the bent portion coupling shaft to a lower end of the bent rigid member is shorter than a length from the bent portion coupling shaft to an upper end of the bent rigid member.

In still another embodiment, the bent unit includes a first bent unit and a second bent unit. An upper end of the first bent unit is coupled to two of the inner end coupling shafts, two of the outer end coupling shafts, or two of the middle coupling shafts of the upper frame. A lower end of the second bent unit is coupled to two of the inner end coupling shafts, two of the outer end coupling shafts, or two of the middle coupling shafts of the lower frame. The longitudinal coupling member includes a cross unit that is formed by two rigid members crossing each other in an X-shape and pivotally coupled by a middle coupling shaft. An upper end of the cross unit of the longitudinal coupling member is coupled to a lower end of the first bent unit, and a lower end of the cross unit of the longitudinal coupling member is coupled to an upper end of the second bent unit.

In yet another embodiment, each of the upper frame and the lower frame includes a plurality of extendable arms each formed by a plurality of cross units connected together, and a coupling mechanism that couples adjoining two of the extendable arms so that the two extendable arms can move together. The coupling mechanism includes first bent members each having a bent shape and each pivotally coupling an inner end coupling shaft of one of adjoining two of the extendable arms and an outer end coupling shaft of the other extendable arm, second bent members each having a bent shape and each pivotally coupling an outer end coupling shaft of the one of adjoining two of the extendable arms and an inner end coupling shaft of the other extendable arm, and corner coupling shafts each pivotally coupling the first bent member and the second bent member at an intersection of the first and second bent members. The upper end of the bent unit is coupled to two of the corner coupling shafts of the upper frame, and the lower end of the bent unit is coupled to two of the corner coupling shafts of the lower frame.

According to the present invention having the above configuration, an operation of increasing or reducing the areas of the upper and lower frames and an operation of changing the height of the longitudinal coupling member are performed together, whereby the shape of the three-dimensional structure can be changed.

DESCRIPTION OF EMBODIMENTS

A variable shape three-dimensional structure according to an embodiment of the present invention includes an upper frame, a lower frame, and a longitudinal coupling member that couples the upper and lower frames such that the upper and lower frames are separated from and parallel to each other. Some embodiments will be described below with reference to the accompanying drawings.

Embodiment Shown in FIGS. 1 to 5

Figure 1:
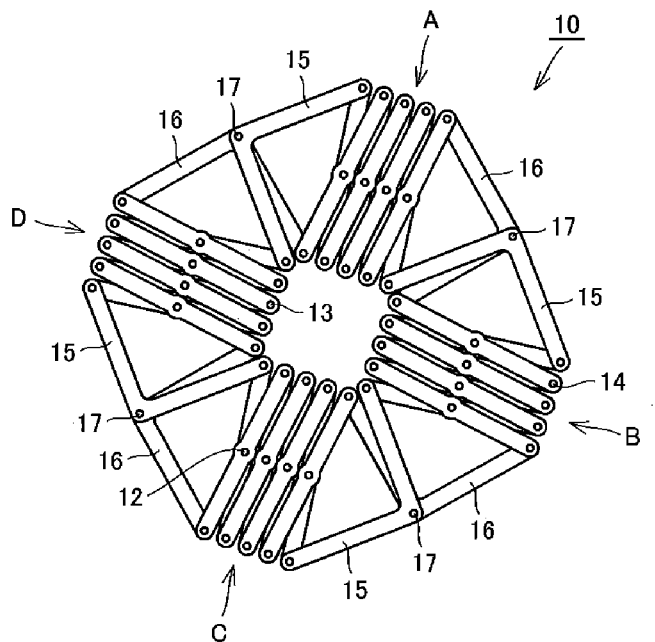
FIG. 1 is a plan view of a quadrilateral frame having the smallest area.
Figure 2:
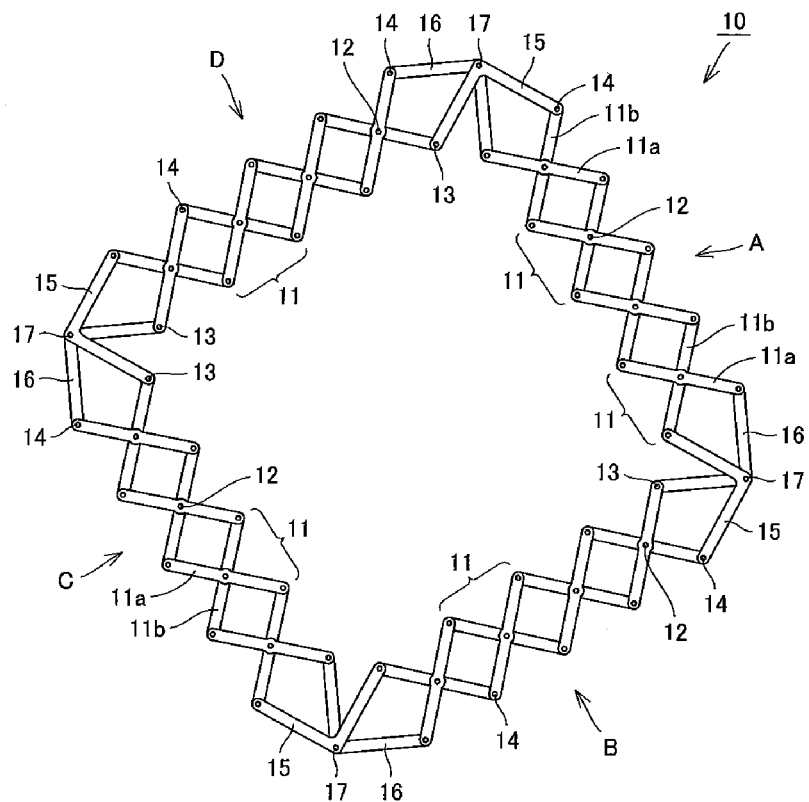
FIG. 2 is a plan view of the quadrilateral frame having an intermediate area.
Figure 3:
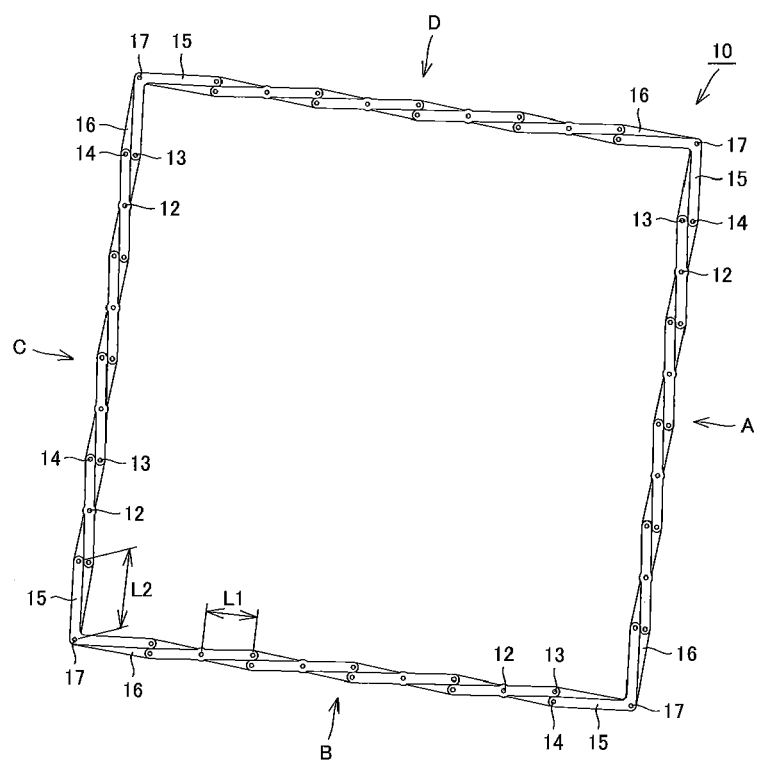
FIG. 3 is a plan view of the quadrilateral frame having the largest area.

FIGS. 1 to 3 show a frame, which is a component of a variable shape three-dimensional structure according to an embodiment of the present invention. The upper and lower frames have substantially the same structure. The upper and lower frames have a polygonal shape. The illustrated frame has a quadrilateral shape as an example of the polygonal shape. FIG. 1 shows the frame having the smallest area, FIG. 2 shows the frame having an intermediate area, and FIG. 3 shows the frame having the largest area. The area herein refers to the area surrounded by the outline of the frame.

FIGS. 1 to 3 illustrate a quadrilateral variable area frame by way of example. However, the configuration and operation are basically the same even if the variable area frame has other polygonal shapes such as triangular, pentagonal, and hexagonal shapes.

The configuration of a quadrilateral frame 10 will be described mainly with reference to FIG. 2.

As shown in the figures, the four sides of the quadrilateral frame 10 are formed by four extendable arms A, B, C, D, and the length of each side changes according to the extending/contracting operation of the extendable arms A, B, C, D. The quadrilateral frame 10 includes a coupling mechanism that couples adjoining two of the extendable arms A, B, C, D so that these two extendable arms can move together. The coupling mechanism thus allows adjoining two of the four sides of the quadrilateral frame 10 to extend and contract together. The coupling mechanism will be described later.

Each extendable arm A, B, C, D includes a plurality of cross units 11 and an end coupling portion. Each cross unit 11 is formed by two rigid members 11a, 11b crossing each other in an X-shape and pivotally coupled by a middle coupling shaft 12. The end coupling portion pivotally couples the ends of adjoining ones of the cross units 11.

In the illustrated embodiment, the end coupling portion includes inner end coupling shafts 13 and outer end coupling shafts 14. The inner end coupling shafts 13 are located on the inner side of the quadrilateral frame 10, and the outer end coupling shafts 13 are located on the outer side of the quadrilateral frame 10. Regarding the shape of each rigid member as a component of the cross unit 11, an imaginary line connecting the inner end coupling shaft 13, the middle coupling shaft 12, and the outer end coupling shaft 14 is straight as viewed in top plan. The rigid member may have any shape as long as the imaginary line connecting these three coupling shafts is straight as viewed in plan. The rigid member may have a curved shape like an S-shape or a Z-shape as viewed in plan, or may have a shape curved in the thickness direction thereof like an arc shape.

The coupling mechanism that couples adjoining two of the extendable arms A, B, C, D so that these two extendable arms can move together includes a first bent member 15, a second bent member 16, and a corner coupling shaft 17 at each corner of the quadrilateral frame 10. The first and second bent members 15, 16 are members bent in a V-shape. Each corner coupling shaft 17 pivotally couples the first and second bent members 15, 16 at their intersection (the position of their bend points).

The first bent member 15 pivotally couples the inner end coupling shaft 13 of the extendable arm of one of adjoining two of the four sides of the quadrilateral frame 10 and the outer end coupling shaft 14 of the extendable arm of the other side. The second bent member 16 pivotally couples the outer end coupling shaft 14 of the extendable arm of the one of adjoining two of the four sides of the quadrilateral frame 10 and the inner end coupling shaft 13 of the extendable arm of the other side.

In order to increase or reduce the area of the frame 10 so that the frame 10 maintains a shape similar to its original polygonal shape, the first and second bent members 15, 16 need to have a predetermined bend angle. Specifically, the first and second bent members 15, 16 need to have a bend angle of A/n, where A represents the sum of interior angles of an n-gon. For example, in the case of a quadrilateral frame, the bend angle of each bent member is 90 degrees. In the case of an equilateral triangular frame, the bend angle of each bent member is 60 degrees. In the case of a regular pentagonal frame, the bend angle of each bent member is 108 degrees. In the case of a regular hexagonal frame, the bend angle of each bent member is 120 degrees.

The relationship in length between each rigid member 11a, 11b as a component of each cross unit 11 and each bent member 15, 16 will be described. The value of L2/L1 is about 1 to 2.16 for an equilateral triangular frame, about 1 to 1.5 for a quadrilateral frame, about 1 to 1.32 for a regular pentagonal frame, and about 1 to 1.23 for a regular hexagonal frame, where L1 represents the interval between the middle coupling shaft 12 and the inner end coupling shaft 13 and the interval between the middle coupling shaft 12 and the outer end coupling shaft 14 in each rigid member 11a, 11b, and L2 represents the interval between the corner coupling shaft 17 and the inner end coupling shaft 13 and the interval between the corner coupling shaft 17 and the outer end coupling shaft 14 in each bent member 15, 16 (see FIG. 3). The larger the value of L2/L1 is in the above range, the larger the degree to which the area of the frame changes is.

The extendable arm forming each side of the polygonal frame is formed by a plurality of cross units 11 connected linearly in a direction in which the extendable arm extends and contracts. In the case of a regular polygonal frame, each side of the frame is formed by the same integer number of cross units 11. The rigid members forming each cross unit 11 have the same length.

When the quadrilateral frame 10 has the smallest area as shown in FIG. 1, each cross unit 11 is in a collapsed state, and the extendable arms A, B, C, D have the smallest length.

When the quadrilateral frame 10 has an intermediate area as shown in FIG. 2, each cross unit 11 is opened such that the two rigid members 11a, 11b are substantially perpendicular to each other, and the extendable arms A, B, C, D have an intermediate length.

When the quadrilateral frame 10 has the largest area as shown in FIG. 3, each cross unit 11 is in a fully opened state, and the inner end coupling shafts 13 of the two rigid members 11a, 11b of each cross unit 11 are located close to the outer end coupling shafts 14 of the two rigid members 11a, 11b of each cross unit 11. In this state, the extendable arms A, B, C, D forming each side of the quadrilateral frame 10 have the largest length.

Figure 4:
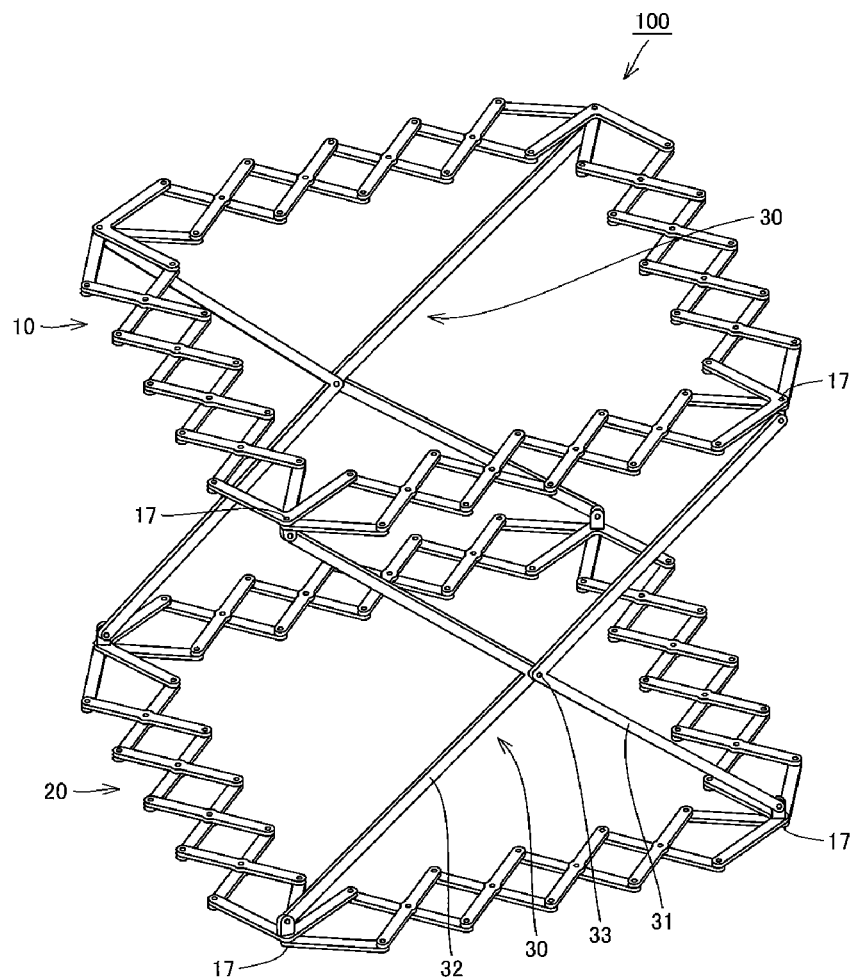
FIG. 4 is a perspective view of a variable shape three-dimensional structure according to an embodiment of the present invention.

FIG. 4 shows an example of a variable shape three-dimensional structure 100 according to the embodiment of the present invention. The variable shape three-dimensional structure 100 shown in the figure includes an upper frame 10, a lower frame 20, and two longitudinal coupling members 30. Each of the upper and lower frames 10, 20 is the frame shown in FIGS. 1 to 3. The two longitudinal coupling members 30 couple the upper and lower frames 10, 20 such that the upper and lower frames 10, 20 are separated from and parallel to each other.

In the illustrated embodiment, each longitudinal coupling member 30 is formed by a bent unit. The bent unit 30 includes a first bent rigid member 31, a second bent rigid member 32, and a bent portion coupling shaft 33. The first and second bent rigid members 31, 32 are members bent in a V-shape so that the V-shapes of the first and second bent rigid members 31, 32 open in opposite directions. The bent portion coupling shaft 33 pivotally couples the bent portion of the first bent rigid member 31 and the bent portion of the second bent rigid member 32.

As shown in the figure, the upper end of each bent unit 30 is coupled to the upper frame 10 located at an upper position, and the lower end of each bent unit 30 is coupled to the lower frame 20 located at a lower position. Specifically, the upper ends of the first and second bent rigid members 31, 32 of each bent unit 30 are coupled to two of the corner coupling shafts 17 of the upper frame 10, and the lower ends of the first and second bent rigid members 31, 32 of each bent unit 30 are coupled to two of the corner coupling shafts 17 of the lower frame 20.

Figure 5:
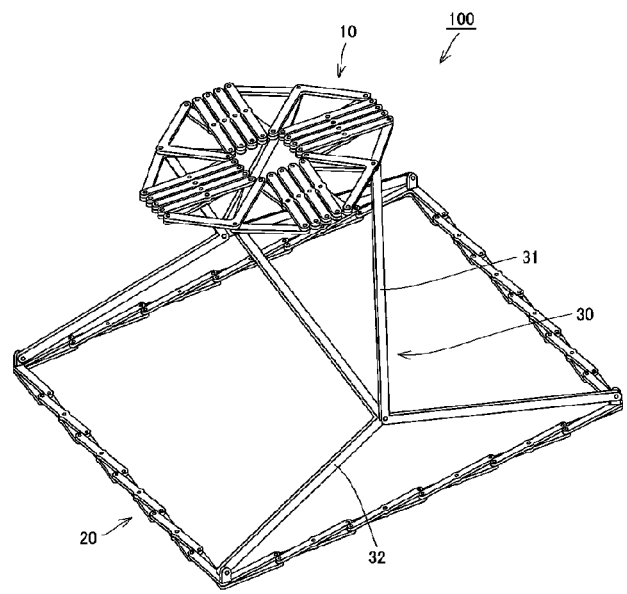
FIG. 5 is a perspective view of the variable shape three-dimensional structure with its upper frame having a reduced area and its lower frame having an increased area.

In the state shown in FIG. 5, the upper frame 10 has a reduced area and the lower frame 20 has an increased area. As the areas of the upper and lower frames 10, 20 change, the interval between the upper ends of the first and second bent rigid members 31, 32 of each bent unit 30 decreases and the interval between the lower ends of the first and second bent rigid members 31, 32 of each bent unit 30 increases accordingly. The bent rigid members 31, 32 are members having a "V-shape." However, this "V-shape" need not necessarily be a precise "V-shape," and may be a curved shape substantially forming a V-shape. Regarding the shape of each bent rigid member 31, 32, the length from the bent portion coupling shaft 33 to the upper end of the bent rigid member 31, 32 and the length from the bent portion coupling shaft 33 to the lower end of the bent rigid member 31, 32 may be the same or different from each other.

Figure 6:
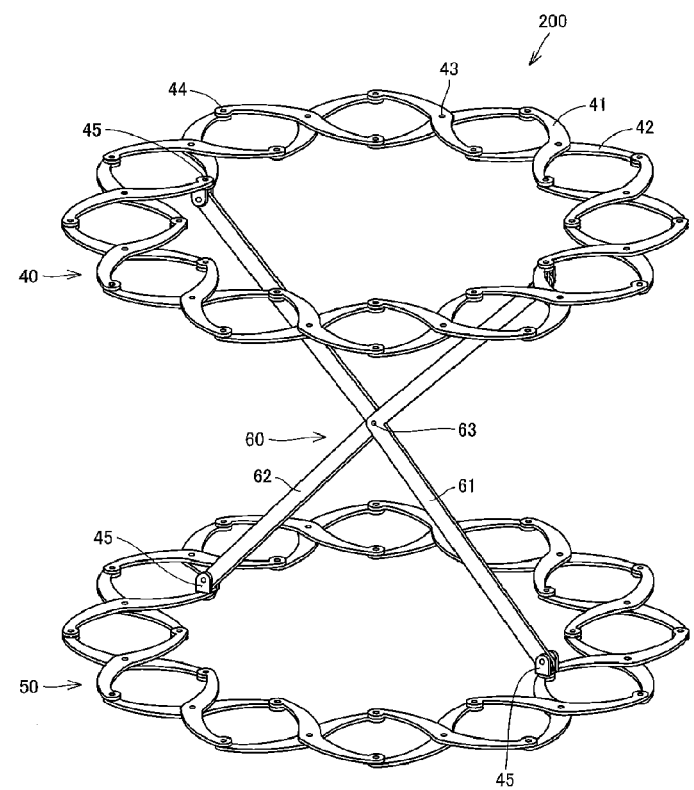
FIG. 6 is a perspective view of a variable shape three-dimensional structure according to another embodiment of the present invention.
Figure 7:
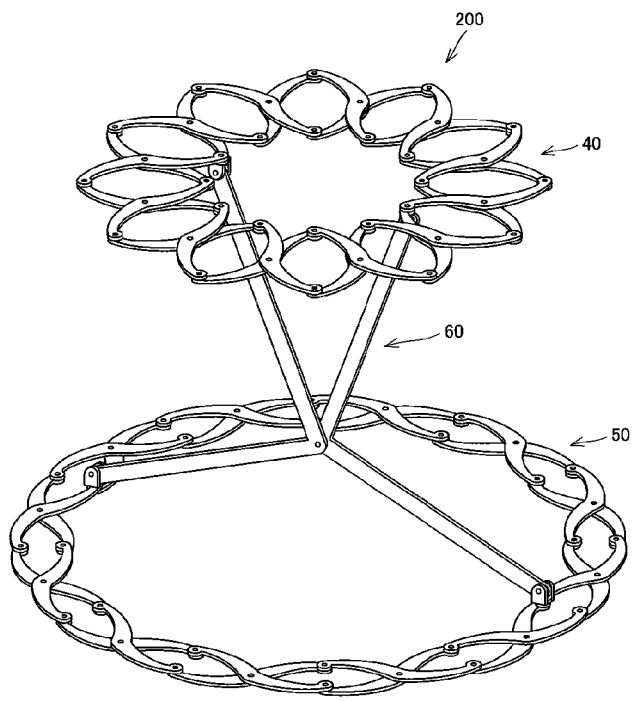
FIG. 7 is a perspective view of the variable shape three-dimensional structure with its upper frame having a reduced area and its lower frame having an increased area.

Embodiment Shown in FIGS. 6 and 7

FIGS. 6 and 7 show a variable shape three-dimensional structure 200 according to another embodiment of the present invention. The variable shape three-dimensional structure 200 shown in the figures includes a ring-shaped upper frame 40, a ring-shaped lower frame 50, and a single longitudinal coupling member 60. The longitudinal coupling member 60 couples the upper and lower frames 40, 50 such that the upper and lower frames 40, 50 are separated from and parallel to each other.

The upper frame 40 and the lower frame 50 have substantially the same structure. Each frame 40, 50 is formed by a plurality of cross units connected in a circumferential direction to form a ring shape. As shown in the figures, each cross unit is formed by a first rigid member 41, a second rigid member 42, and a middle coupling shaft 43. The first rigid member 41 is curved convexly in one direction on the same plane, and the second rigid member 42 is curved convexly in the other direction on the same plane. The first and second rigid members 41, 42 are placed to cross each other in an X-shape and are pivotally coupled by the middle coupling shaft 43 at their intersection. The outer peripheral ends of adjoining ones of the cross units are pivotally coupled by an outer coupling shaft 44, and the inner peripheral ends of adjoining ones of the cross units are pivotally coupled by an inner coupling shaft 45. The ring-shaped upper and lower frames 40, 50 are formed in this manner.

In the illustrated embodiment, the longitudinal coupling member 60 is formed by a bent unit. The bent unit 60 includes a first bent rigid member 61, a second bent rigid member 62, and a bent portion coupling shaft 63. The first and second bent rigid members 61, 62 are members bent in a V-shape so that the V-shapes of the first and second bent rigid members 61, 62 open in opposite directions. The bent portion coupling shaft 63 pivotally couples the bent portion of the first bent rigid member 61 and the bent portion of the second bent rigid member 62.

The upper end of the bent unit 60 is coupled to two of the inner end coupling shafts 45 of the ring-shaped upper frame 40 which oppose each other. The lower end of the bent unit 60 is coupled to two of the inner end coupling shafts 45 of the ring-shaped lower frame 50 which oppose each other.

As can be seen from the comparison between FIGS. 6 and 7, the area of the upper frame 40 is reduced and the area of the lower frame 50 is increased by reducing the interval between the upper ends of the two rigid members 61, 62 of the bent unit 60 and increasing the interval between the lower ends of the two rigid members 61, 62 of the bent unit 60. Although not shown in the figures, the area of the upper frame 40 is increased and the area of the lower frame 50 is reduced by increasing the interval between the upper ends of the two rigid members 61, 62 and reducing the interval between the lower ends of the two rigid members 61, 62.

Figure 8:
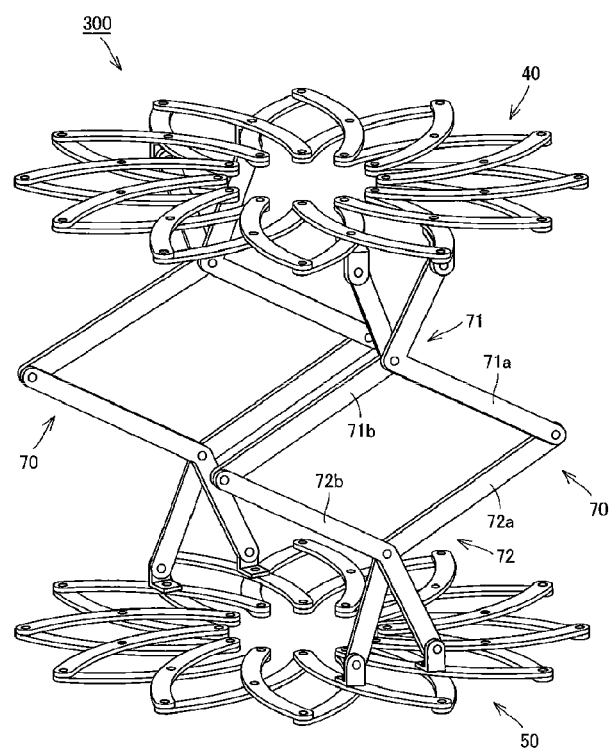
FIG. 8 is a perspective view of a variable shape three-dimensional structure according to still another embodiment of the present invention.
Figure 9:
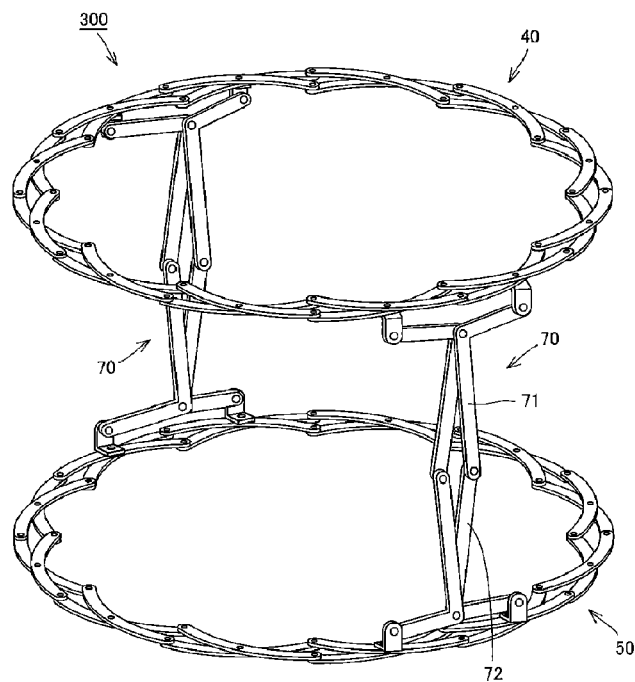
FIG. 9 is a perspective view of the variable shape three-dimensional structure with its upper and lower frames having an increased area.
Figure 10:
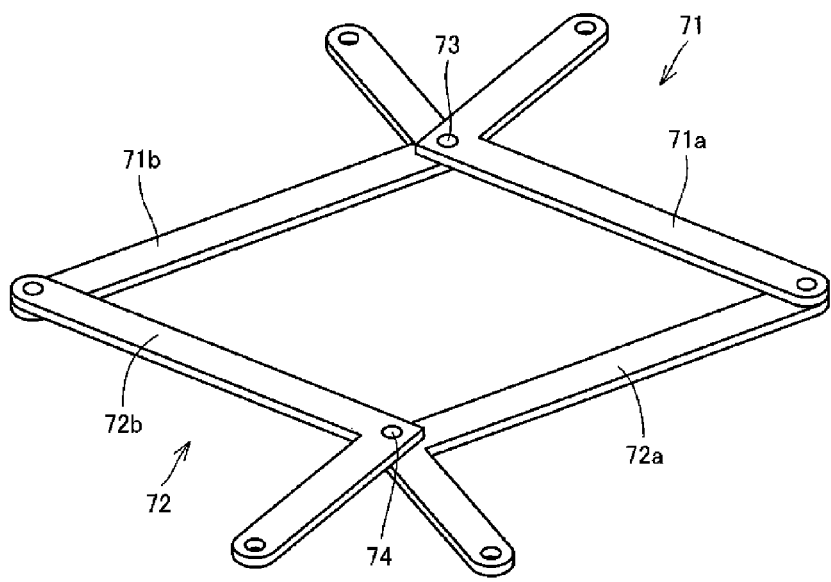
FIG. 10 is a perspective view showing an example of a bent unit.

Embodiment Shown in FIGS. 8 to 10

FIGS. 8 and 9 show a variable shape three-dimensional structure 300 according to still another embodiment of the present invention. The variable shape three-dimensional structure 300 shown in the figures includes a ring-shaped upper frame 40, a ring-shaped lower frame 50, and two longitudinal coupling members 70. The ring-shaped upper frame 40 and the ring-shaped lower frame 50 are similar to those shown in FIGS. 6 and 7. The two longitudinal coupling members 70 couple the upper and lower frames 40, 50 such that the upper and lower frames 40, 50 are separated from and parallel to each other.

The upper frame 40 and the lower frame 50 have substantially the same structure. The structure of each frame 40, 50 is as described in the above embodiment.

In the illustrated embodiment, each longitudinal coupling member 70 includes a first bent unit 71 and a second bent unit 72. An end of the first bent unit 71 and an end of the second bent unit 72 are pivotally coupled together. Each bent unit 71, 72 includes a first bent rigid member 71a, 72a, a second bent rigid member 71b, 72b, and a bent portion coupling shaft 73, 74. The first and second bent rigid members 71a, 72a, 71b, 72b are members bent in a V-shape so that the V-shapes of the first and second bent rigid members 71a, 72a, 71b, 72b open in opposite directions. The bent portion coupling shaft 73, 74 pivotally couples the bent portion of the first bent rigid member 71a, 72a and the bent portion of the second bent rigid member 71b, 72b.

As shown in the figures, the upper end of the first bent unit 71 is coupled to two of middle coupling shafts of the ring-shaped upper frame 40. The lower end of the second bent unit 72 is coupled to two of middle coupling shafts of the ring-shaped lower frame 50. In a modification, the upper end of the first bent unit 71 may be coupled to two of inner end coupling shafts or two of outer end coupling shafts of the ring-shaped upper frame 40, and the lower end of the second bent unit 72 may be coupled to two of inner end coupling shafts or two of outer end coupling shafts of the ring-shaped lower frame 50.

Referring to FIG. 10, the shape of each bent rigid member of each bent unit will be described. Regarding each of the first bent rigid member 71a and the second bent rigid member 71b of the first bent unit 71, the length from the bent portion coupling shaft 73 to the upper end of the bent rigid member 71a, 71b is shorter than the length from the bent portion coupling shaft 73 to the lower end of the bent rigid member 71a, 71b. Regarding each of the first bent rigid member 72a and the second bent rigid member 72b of the second bent unit 72, the length from the bent portion coupling shaft 74 to the lower end of the bent rigid member 72a, 72b is shorter than the length from the bent portion coupling shaft 74 to the upper end of the bent rigid member 72a, 72b.

In the state shown in FIG. 8, the interval between the upper ends of the first and second bent rigid members 71a, 71b of the first bent unit 71 is small, and the ring-shaped upper frame 40 has a reduced area. Similarly, the interval between the lower ends of the first and second bent rigid members 72a, 72b of the second bent unit 72 is small, and the ring-shaped lower frame 50 has a reduced area.

In the state shown in FIG. 9, the interval between the upper ends of the first and second bent rigid members 71a, 71b of the first bent unit 71 is large, and the ring-shaped upper frame 40 has an increased area. Similarly, the interval between the lower ends of the first and second bent rigid members 72a, 72b of the second bent unit 72 is large, and the ring-shaped lower frame 50 has an increased area. The interval between the upper and lower frames 40, 50 is relatively small in the state shown in FIG. 8 and is relatively large in the state shown in FIG. 9.

Figure 11:
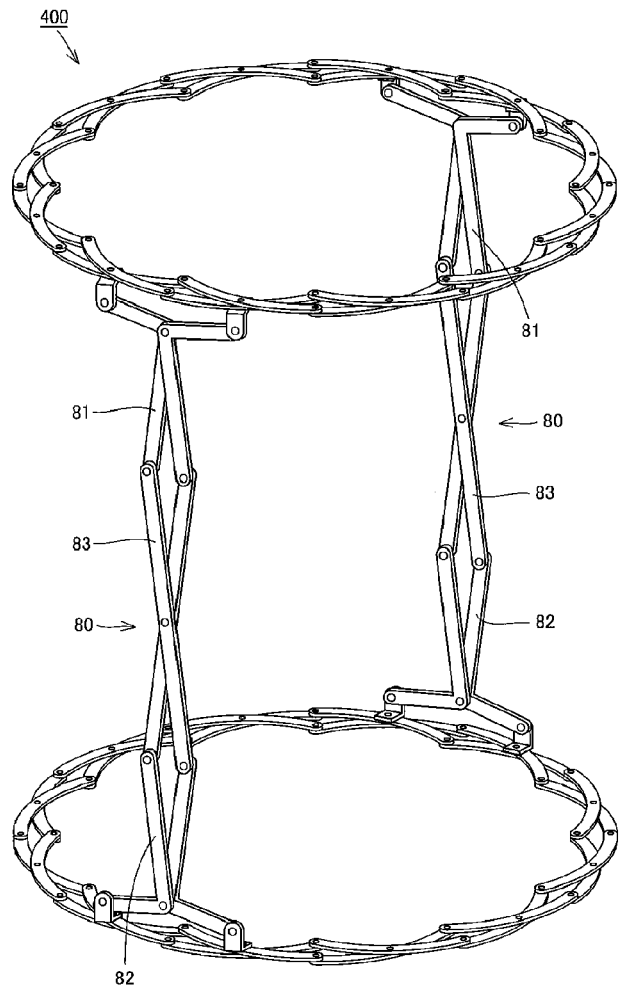
FIG. 11 is a perspective view of a variable shape three-dimensional structure according to yet another embodiment of the present invention.
Figure 12:
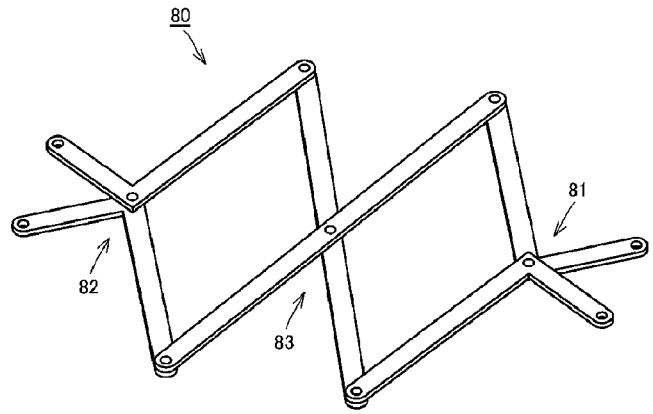
FIG. 12 is a perspective view showing another example of the bent unit.

Embodiment Shown in FIGS. 11 and 12

FIGS. 11 and 12 show a variable shape three-dimensional structure 400 according to yet another embodiment of the present invention. The embodiment shown in FIGS. 11 and 12 is different from that shown in FIGS. 8 to 10 only in the structure of the longitudinal coupling member. Accordingly, the same elements are denoted with the same reference characters, and detailed description thereof will be omitted.

Each longitudinal coupling member 80 of the variable shape three-dimensional structure 400 shown in FIGS. 11 and 12 includes a first bent unit 81, a second bent unit 82, and a cross unit 83. The upper end of the first bent unit 81 is coupled to two of inner end coupling shafts, two of outer end coupling shafts, or two of middle coupling shafts of the ring-shaped upper frame 40. The lower end of the second bent unit 82 is coupled to two of inner end coupling shafts, two of outer end coupling shafts, or two of middle coupling shafts of the ring-shaped lower frame 50. In the illustrated embodiment, each bent unit 81, 82 is coupled to two of the middle coupling shafts of a corresponding one of the upper and lower frames 40, 50.

The cross unit 83 is formed by two rigid members crossing each other in an X-shape and pivotally coupled by a middle coupling shaft. The upper end of the cross unit 83 is pivotally coupled to the lower end of the first bent unit 81, and the lower end of the cross unit 83 is pivotally coupled to the upper end of the second bent unit 82.

Unlike the embodiment shown in FIGS. 8 to 10, in the embodiment shown in FIGS. 11 and 12, each longitudinal coupling member 80 includes the cross unit 83 in the middle. The interval between the upper and lower frames 40, 50 changes to a greater extent as compared to the embodiment shown in FIGS. 8 to 10.

Although some embodiments of the present invention are described above with reference to the drawings, the present invention is not limited to the illustrated embodiments. Various modifications or variations can be made to the illustrated embodiments without departing from the spirit and scope of the present invention.

The variable shape three-dimensional structure can be advantageously used in many applications such as architectural structures, containers, exhibits, pavilions, play equipment, assembling toys, learning materials, decorations, art objects, furniture, beds of vehicles, lighting devices, enclosures for animals such as pets, steps, robot bodies, fish tanks, pools, bathroom stalls, dressing stalls, shower stalls, aboveground buildings, underground buildings, underwater buildings, aerial buildings, simple apartments (e.g., for stricken areas), warehouses, devices for holding a shower hose, a kitchen hose, or a fire hose, vegetable factories, tents, and zoo and botanical gardens.

The invention claimed is:

1. A variable shape three-dimensional structure, comprising:
   an upper frame;
   a lower frame; and
   a longitudinal coupling member that couples said upper and lower frames such that said upper and lower frames are separated from and parallel to each other, wherein said upper frame includes
      a plurality of cross units each formed by two rigid members crossing each other in an X-shape and pivotally coupled by a middle coupling shaft, and
      an end coupling portion that pivotally couples ends of said rigid members of adjoining ones of said cross units,
   said end coupling portion of said upper frame includes inner end coupling shafts located on an inner side of said upper frame, and outer end coupling shafts located on an outer side of said upper frame, said lower frame includes
a plurality of cross units each formed by two rigid members crossing each other in an X-shape and pivotally coupled by a middle coupling shaft, and
an end coupling portion that pivotally couples ends of said rigid members of adjoining ones of said cross units,
said end coupling portion of said lower frame includes inner end coupling shafts located on an inner side of said lower frame, and outer end coupling shafts located on an outer side of said lower frame,
said longitudinal coupling member includes a bent unit, said bent unit including a first bent rigid member, a second bent rigid member, and a bent portion coupling shaft, said first and second bent rigid members being bent in a V-shape so that said V-shapes of said first and second bent rigid members open in opposite directions, said bent portion coupling shaft pivotally coupling a bent portion of said first bent rigid member and a bent portion of said second bent rigid member,
an upper end of said bent unit is coupled to said upper frame located at an upper position, and
a lower end of said bent unit is coupled to said lower frame located at a lower position.

2. The variable shape three-dimensional structure according to claim 1, wherein
said upper end of said bent unit is coupled to two of said inner end coupling shafts of said upper frame which oppose each other, and
said lower end of said bent unit is coupled to two of said inner end coupling shafts of said lower frame which oppose each other.

3. The variable shape three-dimensional structure according to claim 1, wherein
said bent unit includes a first bent unit and a second bent unit, an end of said first bent unit and an end of said second bent unit being pivotally coupled together,
an upper end of said first bent unit is coupled to two of said inner end coupling shafts, two of said outer end coupling shafts, or two of said middle coupling shafts of said upper frame, and
a lower end of said second bent unit is coupled to two of said inner end coupling shafts, two of said outer end coupling shafts, or two of said middle coupling shafts of said lower frame.

4. The variable shape three-dimensional structure according to claim 3, wherein
in each of said first and second bent rigid members of said first bent unit, a length from said bent portion coupling shaft to an upper end of said bent rigid member is shorter than a length from said bent portion coupling shaft to a lower end of said bent rigid member, and
in each of said first and second bent rigid members of said second bent unit, a length from said bent portion coupling shaft to a lower end of said bent rigid member is shorter than a length from said bent portion coupling shaft to an upper end of said bent rigid member.

5. The variable shape three-dimensional structure according to claim 1, wherein
said bent unit includes a first bent unit and a second bent unit,
an upper end of said first bent unit is coupled to two of said inner end coupling shafts, two of said outer end coupling shafts, or two of said middle coupling shafts of said upper frame,
a lower end of said second bent unit is coupled to two of said inner end coupling shafts, two of said outer end coupling shafts, or two of said middle coupling shafts of said lower frame,
said longitudinal coupling member includes a cross unit that is formed by two rigid members crossing each other in an X-shape and pivotally coupled by a middle coupling shaft,
an upper end of said cross unit of said longitudinal coupling member is coupled to a lower end of said first bent unit, and
a lower end of said cross unit of said longitudinal coupling member is coupled to an upper end of said second bent unit.

6. The variable shape three-dimensional structure according to claim 1, wherein
each of said upper frame and said lower frame includes a plurality of extendable arms each formed by a plurality of cross units connected together, and a coupling mechanism that couples adjoining two of said extendable arms so that said two extendable arms can move together,
said coupling mechanism includes
first bent members each having a bent shape and each pivotally coupling an inner end coupling shaft of one of adjoining two of said extendable arms and an outer end coupling shaft of the other extendable arm,
second bent members each having a bent shape and each pivotally coupling an outer end coupling shaft of said one of adjoining two of said extendable arms and an inner end coupling shaft of the other extendable arm, and
corner coupling shafts each pivotally coupling said first bent member and said second bent member at an intersection of said first and second bent members,
said upper end of said bent unit is coupled to two of said corner coupling shafts of said upper frame, and
said lower end of said bent unit is coupled to two of said corner coupling shafts of said lower frame.

* * * * *